(12) United States Patent
Favagrossa

(10) Patent No.: US 7,743,454 B2
(45) Date of Patent: Jun. 29, 2010

(54) WASHING BRUSH FOR AUTOMATIC MOTOR VEHICLE WASHING SYSTEMS

(75) Inventor: Francesco Favagrossa, Viadana Mantova (IT)

(73) Assignee: Favagrossa Edoardo S.r.l., Roncadello Di Casalmaggiore, Cremona (IT)

( * ) Notice: Subject to any disclaimer, the term of this patent is extended or adjusted under 35 U.S.C. 154(b) by 1050 days.

(21) Appl. No.: 10/536,776

(22) PCT Filed: Feb. 4, 2003

(86) PCT No.: PCT/IT03/00053

§ 371 (c)(1),
(2), (4) Date: May 26, 2005

(87) PCT Pub. No.: WO2004/052703

PCT Pub. Date: Jun. 24, 2004

(65) Prior Publication Data

US 2006/0064835 A1 Mar. 30, 2006

(30) Foreign Application Priority Data

Dec. 6, 2002 (IT) .......................... MI2002A2588

(51) Int. Cl.
*B60S 3/06* (2006.01)
(52) U.S. Cl. .............. 15/230.14; 15/230.16; 15/230.19; 15/97.3
(58) Field of Classification Search .............. 15/230.16, 15/230.14, 180, 181, 97.3, 230.19
See application file for complete search history.

(56) References Cited

U.S. PATENT DOCUMENTS

| 3,139,641 | A |   | 7/1964 | Parseghian et al. |   |
|---|---|---|---|---|---|
| 3,241,172 | A |   | 3/1966 | Tilgner |   |
| 3,439,373 | A |   | 4/1969 | Clark |   |
| 6,035,482 | A | * | 3/2000 | Belanger et al. | 15/230.14 |
| 6,564,418 | B1 | * | 5/2003 | Favagrossa | 15/230.16 |
| 6,795,996 | B2 | * | 9/2004 | Ennis et al. | 15/97.3 |

FOREIGN PATENT DOCUMENTS

| DE | 199 07 441 |   | 8/2000 |
|---|---|---|---|
| DE | 201 14 359 |   | 1/2002 |
| JP | 60-128050 |   | 7/1985 |
| JP | 2002-316622 | * | 10/2002 |
| WO | WO 03/018375 A1 | * | 6/2003 |

OTHER PUBLICATIONS

Computer generated English translation of the description of DE 199071441 A1.*
Computer generated English Translation of JP 2002-316622, Oct. 29, 2002.*

* cited by examiner

*Primary Examiner*—Laura C Guidotti
(74) *Attorney, Agent, or Firm*—Hedman & Costigan, P.C.; James V. Costigan

(57) ABSTRACT

The present invention relates to a washing brush for automatic motor vehicle washing systems, comprising a cylindric body on the side outer surface thereof are provided a plurality of bands defining the cleaning elements of the brush. The main feature of the invention is that the band or strip elements extend on the side surface of the cylindric body along direction which are inclined with respect to the axial direction.

2 Claims, 4 Drawing Sheets

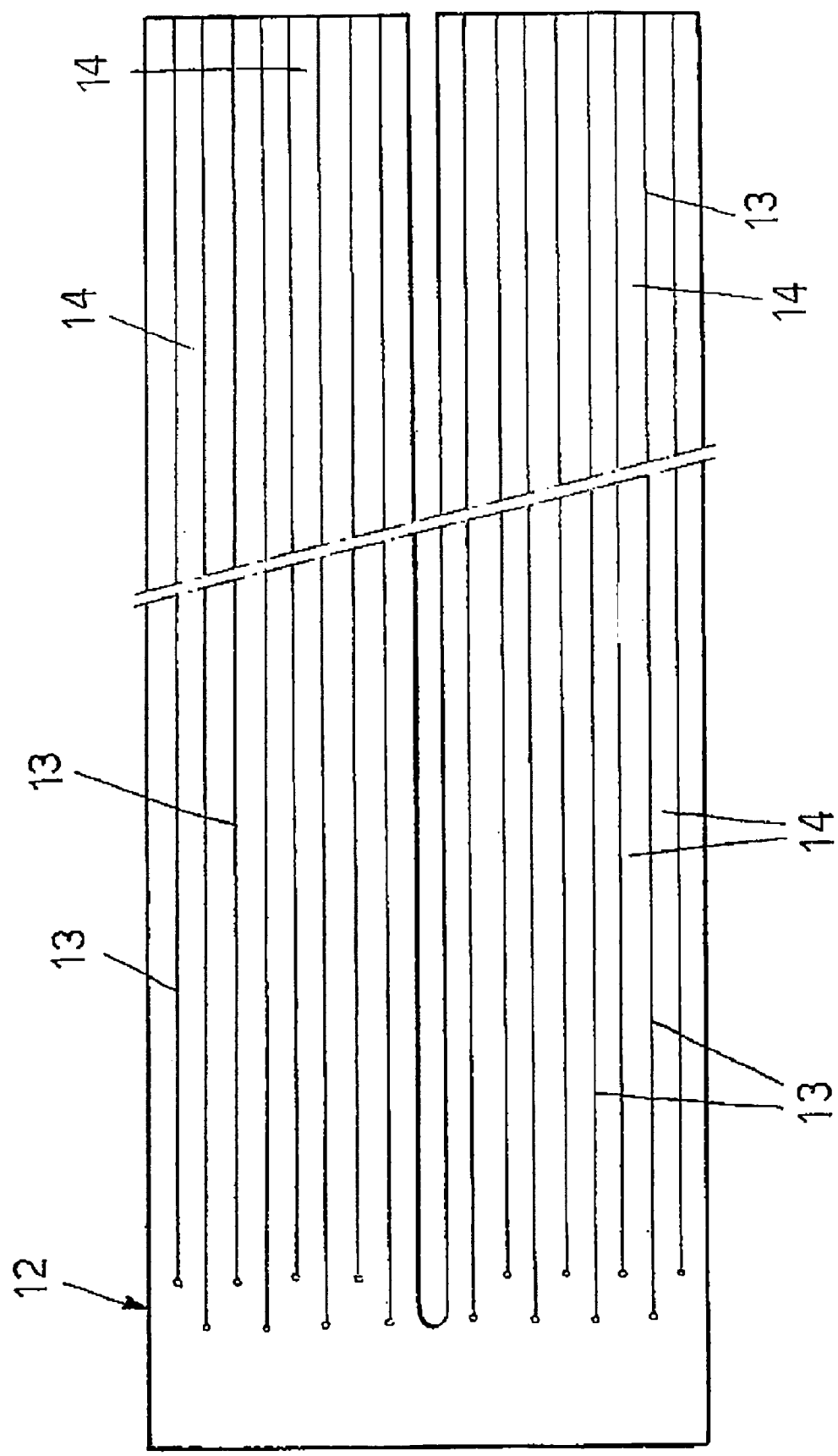

US 7,743,454 B2

WASHING BRUSH FOR AUTOMATIC MOTOR VEHICLE WASHING SYSTEMS

BACKGROUND OF THE INVENTION

The present invention relates to a washing brush to be applied to washing brush assemblies in automatic systems for washing motor vehicles in general.

As is known, automatic systems for washing motor vehicles in general conventionally comprise washing brushes, which are made by coupling, in an axial direction, a plurality of brush elements which are substantially constituted by a cylindric body thereon are coupled band elements comprising cleaning elements formed of a felt or a like material, or a foamed plastics material.

With reference to the diagram shown in FIG. 1, the band elements 1, which are arranged with a substantially vertical arrangement, i.e. parallel to the axis of the cylindric body, provide a vertical discontinuous arrangement perpendicular to the brush movement direction.

In such an arrangement, the controlling motors are supplied with alternating pulses, the uneven amplitudes or values of which make difficult to hold the washing brush in a stable contact condition against the working surface therefor.

Accordingly, the contact gaps provide an objectable noise for a person inside the motor vehicle.

Moreover, it is necessary to frequently adjust the revolution number of the cleaning brush depending on the motor vehicle transiting speed, in order not to leave uncleaned regions along the motor vehicle itself.

Yet another drawback is that, during the rotation of the brush, a person can easily see the central body or tube supporting the cleaning elements, thereby the bush construction appears as a scarcely dense construction, which negatively affects the operating properties of the product.

Yet another drawback is that interspaces are inevitably formed between the several cleaning elements, with a consequent formation of contact lacking spaces on the surfaces to be washed.

Moreover, prior washing brushes generate packaging and transport problems, since it is not possible to provide the cleaning band elements in an ordered manner without bending them according to a small angle thereby frequently deforming the band materials which could render the band elements nearly unusable.

Thus, the packaging cost is inevitably very high.

SUMMARY OF THE INVENTION

The aim of the invention is to overcome the above mentioned drawbacks, by providing a washing brush, to be applied to brush assemblies in automatic systems for washing motor vehicles in general, in which the band elements can be arranged in a much more rational manner so as to eliminate possible interspaces causing contact lackings on the motor vehicle being washed, thereby improving the washing quality.

Within the scope of the above mentioned aim, a main object of the present invention is to provide such a washing brush in which, the number of the cleaning elements contacting the surface to be cleaned being the same, is possible to reduce the number of the band elements or assemblies to be connected to the brush central body or tube.

Yet another object of the present invention is to provide such a washing brush in which the cleaning band elements and related terminal cords can be properly oriented thereby drastically reducing the volume of the washing brush, so as to facilitate the packaging operations.

Yet another object of the present invention is to provide such a washing brush which, owing to its specifically designed features, is very reliable and safe in operation.

According to one aspect of the present invention, the above mentioned aim and objects, as well as yet other objects, which will become more apparent hereinafter, are achieved by a washing brush for washing brush assemblies to be applied to automatic systems for washing motor vehicles in general, comprising a cylindric body on the side outer surface thereof are provided a plurality of band elements defining the cleaning elements of said washing brush, characterized in that said band elements extend on the side surface of said cylindric body along directions which are inclined with respect to the axial direction.

BRIEF DESCRIPTION OF THE DRAWINGS

Further characteristics and advantages of the present invention will become more apparent hereinafter from the following detailed disclosure of a preferred, though not exclusive, embodiment of a washing brush to be applied to washing brush assemblies of automatic systems for washing motor vehicles in general, which is illustrated, by way of an indicative, but not limitative, example, in the accompanying drawings, where:

FIG. 5 is a further schematic view illustrating a band element;

DESCRIPTION OF THE PREFERRED EMBODIMENTS

Figure 6:
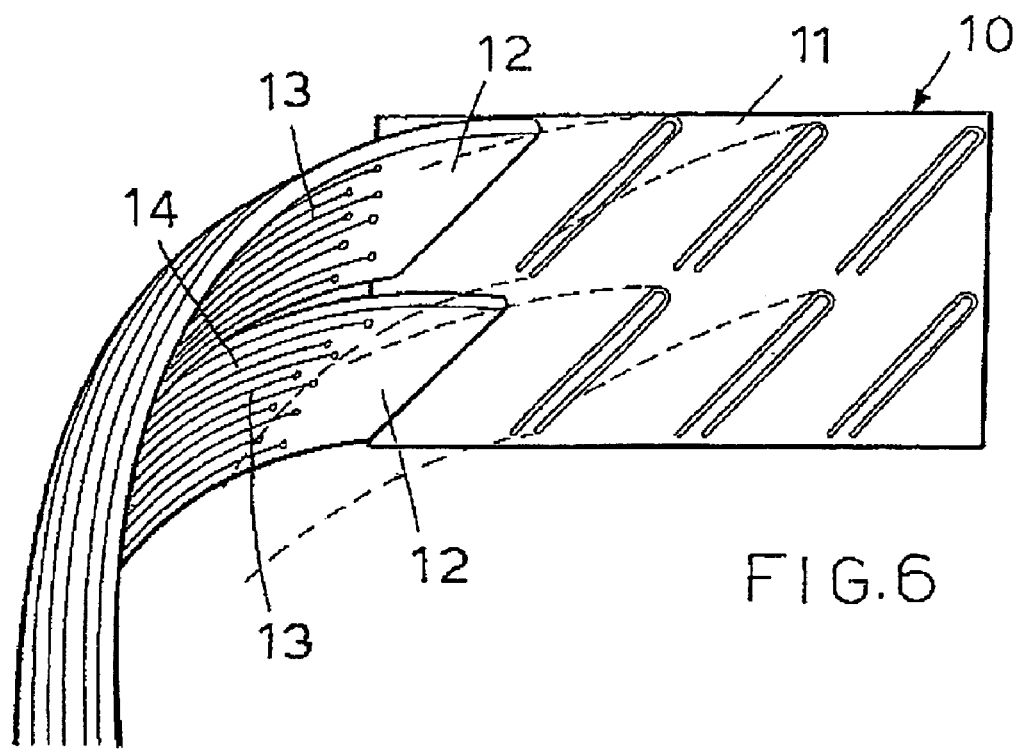
FIG. 6 shows the arrangement of the band elements designed for reducing the packaging size thereof.
Figure 7:
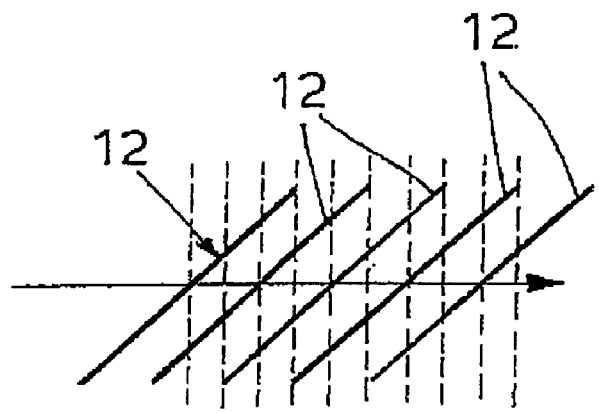
FIG. 7 shows a dynamic operating diagram of the subject washing brush, during a motor vehicle washing operation.

With reference to the number references of the above mentioned figures, the washing brush according to the present invention, which has been generally indicated by the reference number 10, comprises a cylindric ring body 11, of a per se known type, on the side surface thereof are provided a plurality of band elements 12.

Each said band element 12, in particular, advantageously comprises an elongated substantially rectangular flat body of a closed cell foamed material, or an open-cell foamed material or, optionally, a felt material.

The band elements 12 comprise a plurality of longitudinal slits 13, defining a plurality of bristles or strips 14, constituting the cleaning elements of the washing brush.

The main feature of the invention is that the band elements arranged on the side surface of the cylindric ring body 11 are inclined with respect to the axial direction of said cylindric body.

Thus, in actual practice, the band elements will assume a diagonal arrangement or position, allowing the band elements to be arranged in a very rational manner, to provide a very good distribution of the washing bristles, the number of the washing assemblies being the same.

Figure 1:
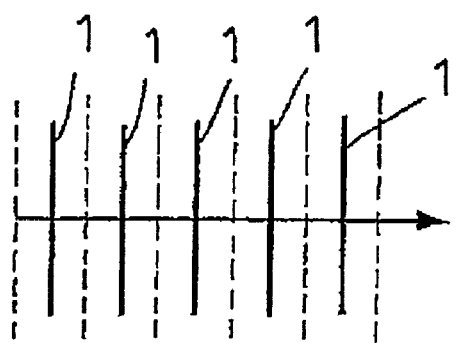
FIG. 1 shows a washing diagram which can be obtained by washing brushes according to the prior art.
Figure 2:
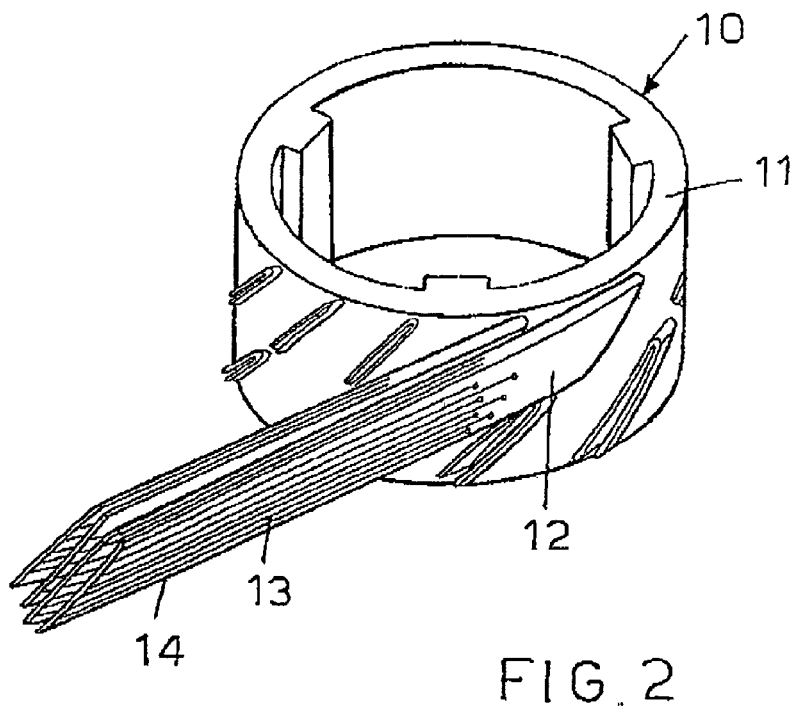
FIG. 2 is a schematic perspective view illustrating a washing brush element, having a cylindric ring body to which are applied, only two band elements.
Figure 3:
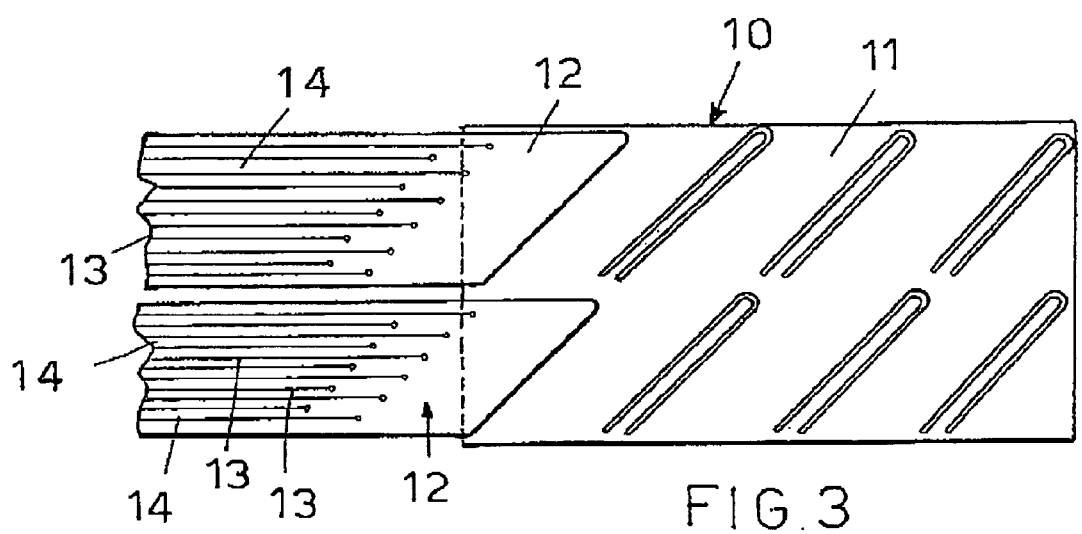
FIG. 3 is an elevation view illustrating the washing brush element shown in FIG. 2.
Figure 4:
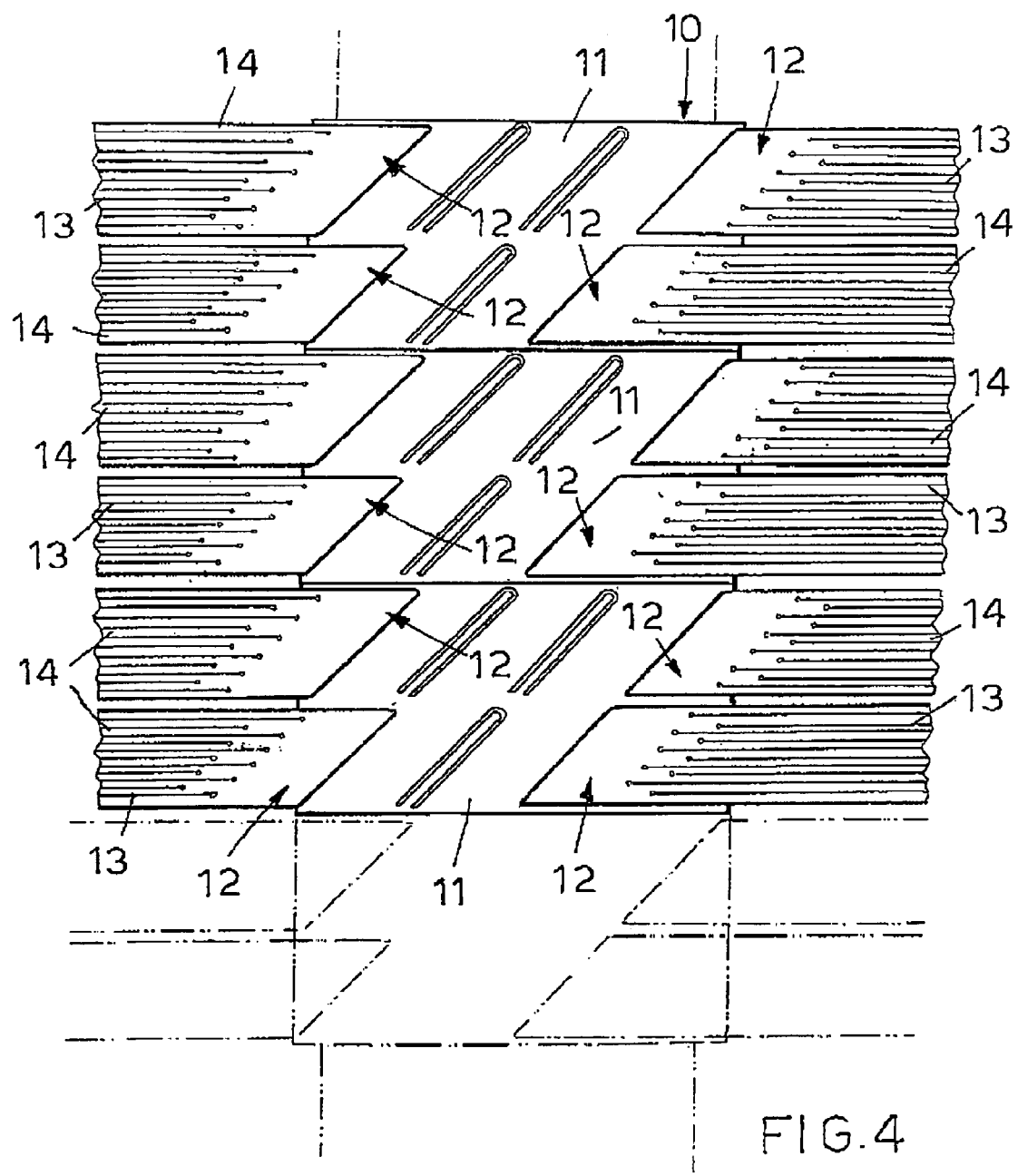
FIG. 4 is a further schematic elevation view illustrating a washing brush assembly made by axially connecting several washing brush elements according to the invention.

Moreover, the slanted arrangement of the band elements, which can be coupled to the surface of the cylindric body 11 by any suitable coupling means, allows to provide a longer slanted band element 12 having a length larger than that of a vertical band element 1 (see the prior art FIG. 1) arranged vertically, that is in a direction parallel to the vertical axis of the cylindric ring element.

Advantageously, each band element is engaged in a corresponding diagonal separated slanted seat, said seats having each a length smaller than the diameter of the cylindric body, being formed on the outer surface of the cylindric ring body 11, being diagonally slanted in a clockwise direction with respect to the vertical axis of the cylindric ring element 11 (see for example FIGS. 2, 3, 4, 6, 7) being diagonally separated from one another (see those same FIGS. 2, 3, 4, 6, 7), and having a substantially U-shape. Moreover, as is in particular shown in FIG. 5, the adjoining cleaning strips or bristles 14 are defined by different slits or cuts longitudinal parallel extending through each brush cylindric ring element.

According to a preferred inclination, the band element has in average a 25% larger length.

In this connection it should be pointed out that the inclination of the band elements can be further changed, to also provide further larger lengths.

Accordingly, the amount of material being the same, the number of the band elements will be smaller, since each band element will have a width larger than the widths of the band elements arranged parallel to the axis, and accordingly perpendicularly to the motor vehicle to be washed motion direction.

Accordingly, the reduction of the number of the band elements will reduce the labor necessary for making the single components on the washing brush and for fixing them, independently from the method for carrying out the fixing operation.

Moreover, the slanted or diagonal arrangement allows the orienting of the band elements and related end cleaning strips or bristles to be offset, notwithstanding a radial effect provided by the centrifugal force.

Actually, in automatic motor vehicle washing systems, the maximum speed does not exceed 110 rpm's and the natural trend of the band elements to fall in a natural direction due to their oblique positions, allows said band elements to "close" possible spaces or gaps, in an optimum manner.

Moreover, the colored spiral obtained by adjoining different colors on the band elements would be perfectly arranged with respect to its epicycloidal pattern.

Furthermore, the slanted position of the band elements with the washing brush assembly arranged in a vertical position, in a stop condition thereof, will allow the band elements to fall in an ordered manner by automatically overlapping and partially contacting one another, (as shown in FIG. 6) thereby the brush assembly can be packaged with a comparatively small size, without damaging the product in its packaged condition.

Thus, by greatly reducing the packaging requirements, it would be possible to control in an optimum manner the required packaging volumes, with a reduction of the transport expenses of about 300%.

Moreover, the slanted arrangement of the band elements provides an upward or downward directed entraining effect thereon, since their natural opening movement is not perpendicular to the axis of the cylindric body the band elements are connected to.

From the above disclosure it should be apparent that the invention fully achieves the intended aim and objects.

In particular, the slanted or inclined arrangement of the band elements provides great advantages both from a functional and from a production standpoint.

The invention, as disclosed, is susceptible to several modifications and variations, all of which will come within the scope of the invention.

Moreover, all of the constructional details, can be replaced by other technically equivalent elements.

In practicing the invention, the used materials, provided that they are compatible to the intended application, as well as the contingent size and shapes, can be any, depending on requirements.

The invention claimed is:

1. A washing brush element designed to be axially coupled to a plurality of like washing brush elements for making a washing brush assembly for use in automatic motor vehicle washing systems, said washing brush element comprising a cylindric ring body having a vertical axis and a side cylindric outer surface, on said cylindric outer surface being defined a plurality of seats each for fixedly receiving therein a cleaning closed cell or felt material band element, each said band element comprising an elongated substantially rectangular flat body having an end portion thereof fixedly restrained in a respective said seat of said cylindric ring body, each said band element being so longitudinally cut as to define a plurality of adjoining substantially flat and parallel different length cleaning bristles, wherein said seats are diagonally separated diagonal slanted U-shape seats having a length smaller than a diameter of said cylindric ring body and such an inclination with respect to said vertical axis of said cylindric ring body that, with said cylindric ring body in a vertical non driven condition thereof, each said band element will fall so as to overlap on and partially contact an adjoining like band element, said inclination being such that each said band element has a length larger than a length that a vertical like band element would have if it would be arranged in a vertical direction parallel to said vertical axis of said cylindric ring body.

2. A washing brush element, according to claim 1, wherein each said band element has different adjoining colors formed thereon.

* * * * *